United States Patent

[11] 3,545,336

[72] Inventor Charley Savko
 726 E. Lincoln Ave., Columbus, Ohio 43224
[21] Appl. No. 814,331
[22] Filed April 8, 1969
[45] Patented Dec. 8, 1970

[54] APPARATUS FOR FORMING SLITS IN AN ELONGATED LINEARLY MOVING TUBE
 5 Claims, 5 Drawing Figs.
[52] U.S. Cl. .................................................. 90/15,
 83/54, 83/352, 83/420, 83/488, 90/21
[51] Int. Cl. ..................................................... B23c 3/00,
 B26d 3/06
[50] Field of Search .................................................. 90/15, 21;
 83/54, 355, 350, 352, 487, 420, 488

[56] References Cited
 UNITED STATES PATENTS
| | | | |
|---|---|---|---|
| 2,629,164 | 2/1953 | Pridy ............................. | 90/15 |
| 3,173,320 | 3/1965 | Dabernard et al. ............. | 83/54X |
| 3,457,830 | 7/1969 | Menfaster ...................... | 90/15 |

Primary Examiner—Frank T. Yost
Attorney—Mahoney, Miller & Stebens

ABSTRACT: Apparatus operated in timed sequence to an extruded tube to slit the tube at longitudinally-spaced intervals with radially-disposed cutting discs which are movable radially in and out relative to the tube between operative and inoperative positions. The cutting discs are adjustable angularly about the tube without disturbing their radial orientation relative to the tube.

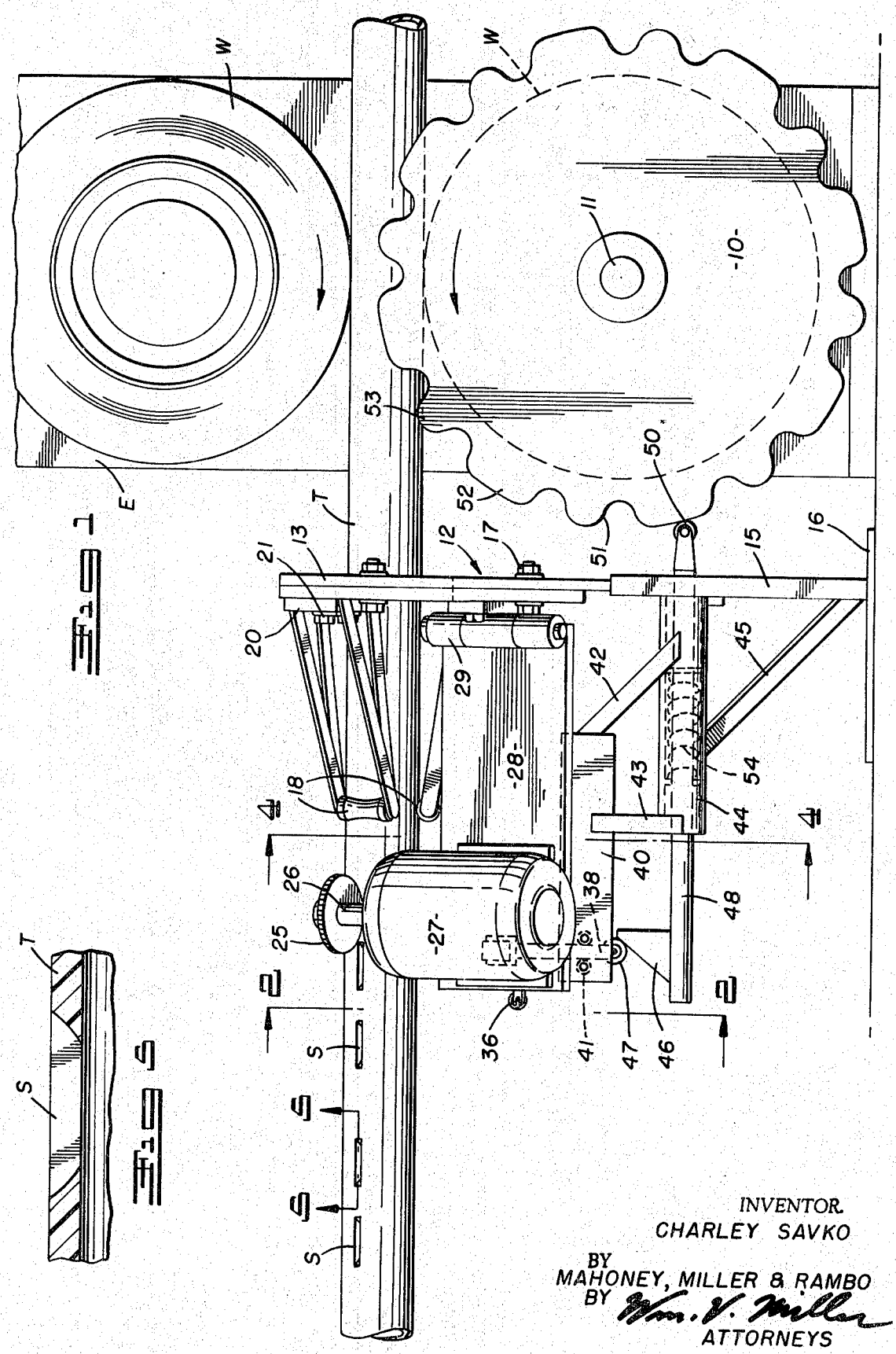

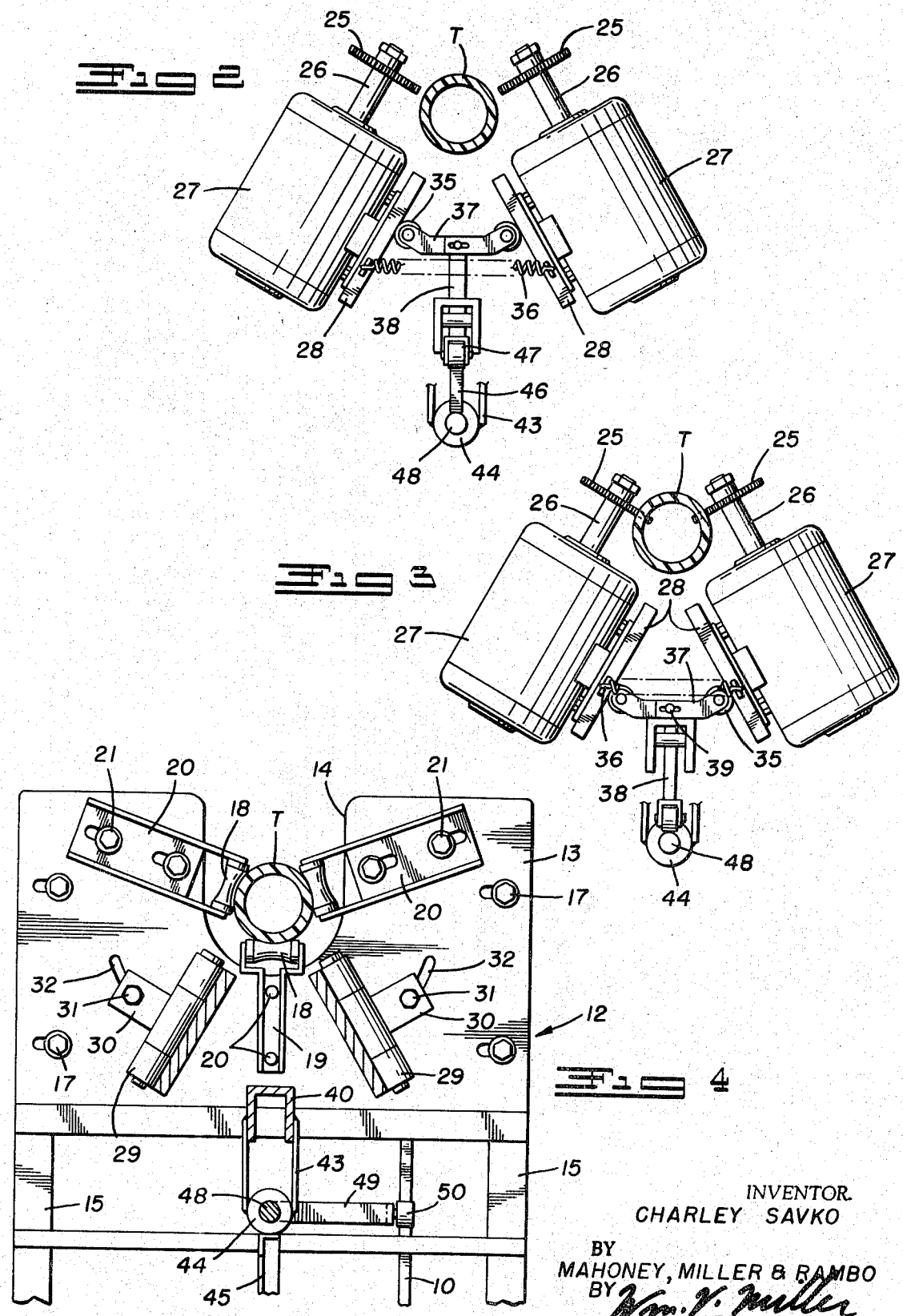

APPARATUS FOR FORMING SLITS IN AN ELONGATED LINEARLY MOVING TUBE

Tubes or conduits, such as plastic pipe, are often slit to provide for use as drainage pipe, etc. Machines have been provided in the prior art for slitting the tubing as it is extruded and these machines have included rotatable cutters. However, these cutters have not been independently mounted for relative angular adjustment to permit different angular patterns for the slits and have not been mounted to permit ready adjustment to vary the longitudinal spacing of the slits in the tubing. Also, the cutters did not enter the tubing radially which produced undue stresses on the cutters and tubing.

The present invention overcomes these difficulties by mounting the cutting disks so that they swing into the pipe through radially directed planes in a predetermined angular relationship. The cutters are mounted independently but are moved radially inwardly and outwardly simultaneously. The independent mounting is such that the cutters can be adjusted angularly relatively about the axis of the pipe without disturbing their radial relationship to the pipe. Also, they are so mounted that the longitudinal spacing of the resulting slits can be varied readily.

In the accompanying drawings, a preferred embodiment of this invention is illustrated and in these drawings:

FIG. 1 is a side elevational view of the apparatus.

FIG. 2 is a transverse sectional view taken along line 2–2 of FIG. 1 showing the rotary cutters in inoperative position spaced from the tube.

FIG. 3 is a view similar to FIG. 2 but showing the cutters in operation to slit the tube.

FIG. 4 is a transverse sectional view taken along line 4–4 of FIG. 1.

FIG. 5 is an enlarged longitudinal sectional view taken through the slit tube along the line 5–5 of FIG. 1.

With reference to the drawings, there is illustrated in FIG. 1 plastic tubing T emerging from an extruding machine E of a suitable type as an axial or linearly moving continuous body. It is desired to produce slits S in the tubing and the apparatus of the present invention produces those slits in a predetermined pattern of radial slits disposed at longitudinally-spaced intervals and angularly-shaped positions in the tubing. According to this invention, both the angular spacing and the longitudinally spacing of the slits can be readily varied. The tubing passes between the opposed grooved pulling wheels W of the extruding machine and one of these wheels has a timing cam 10 keyed on an extension 11 of the supporting shaft thereof. These wheels W force the tubing into association with the slitting apparatus of this invention which is mounted in cooperation with the extruding machine E to receive and slit the tubing discharged thereby.

This apparatus includes a supporting stand 12 of any suitable form which is indicated as comprising an upper support plate 13 disposed transversely adjacent the extruding machine E and having a notch 14 at its upper edge through which tubing T is axially moved. This plate 13 is supported at a suitable level by the legs 15 upstanding from a base plate 16. The plate 15 is mounted for transverse or lateral adjustment relative to the legs 15 by means of the bolt and slot connections 17.

For supporting the tube T in a centered positions as it emerges from the notch 14 and during the slitting operation a plurality of support rollers 18 are provided, being shown as three in number. These rollers are concavely grooved so as to properly embrace the tubing surface as it is moved axially between the rollers. One roller 18 is disposed at the lower side of the tube and is carried on the upper end of a support arm 19 which is fixed by bolts 20 to the plate 13. The other rollers 18 engage the tubing at opposite sides upwardly of the position of the lower roller 18 and tend to force it downwardly thereon. These rollers are supported on arms 20 which are downwardly and inwardly inclined toward each other. Each arm 20 is supported on the plate 13 by bolt and slot connections 21 which permit adjustment of the upper rollers in accordance with the diameter of the tubing.

The slitting cutters 25 preferably are of the milling type being rotatable disks which are shown as a pair but may be provided in any suitable number. These cutter disks are disposed radially relative to the tubing during the cutting operation. Each cutter 25 is keyed to the drive shaft 26 of an electric motor 27. Each motor 27 is fixed on the outer end of a plate 28 which has at its inner end a hinge structure 29. This hinge structure includes a bracket 30 which is carried by a bolt 31 that is mounted for arcuate adjustment about the axis of the tubing T or the notch 14 in an arcuate slot 32 which is concentric with the axis of movement of the tubing. The plane of each cutter disk passes radially through the axis of the tubing, and the hinge axis is at a right angle to the plane of the cutter and parallel to the cutter axis. This permits angular adjustment of the radial planes of the cutters 25 without destroying their radial disposition relative to the tubes. The cutters 25, thus mounted, will swing radially inwardly and outwardly toward each other and relative to the tubing and will automatically adjust themselves to the radius or diameter of the tubing. Also, as indicated, their angular spacing may be varied by means of bolts and slots 31—32 without getting them out of their radial disposition relative to the tubing.

For moving the independently mounted cutter disks 25 radially inwardly and outwardly relatively and simultaneously, a cam arrangement is provided which includes the timing cam wheel 10 previously mentioned. This arrangement includes a pair of followers rollers 35 which engage the inner surfaces of the hinged plates 28 that produce a camming action, it being noted that these plates are disposed in converging planes extending longitudinally of the tubing T. A tension spring is connected between the two hinged plates 28 and tends to draw them toward each other. The rollers 35 are carried on the opposed outer ends of a crosshead 37 which is mounted on the upper end of a vertically reciprocable guide rod 38 by means of a bolt and slot connection 39 which permits lateral or transverse adjustment of the crosshead and the rollers carried thereby. The rod 38 is slidable vertically in a fixed support arm 40 by means including guide rolls 41. This arm 40 is carried by braces 42 and 43 fixed to a lower longitudinally extending guide sleeve 44 which, in turn, is supported from the stand 12 by the lines 45. It will be noted (FIG. 4) that the support for the lower roller 18, the guide arm 40, and the guide sleeve 44 all have their center lines in a common plane with the axis of the tubing or the notch 14. The rod 38, when reciprocated vertically, will raise or lower the rollers 35 which will produce outward swinging of the plates 28 or permit the spring 36 to pull them inwardly. Outward movement will move the cutters 25 radially outwardly out of engagement with the tubing and inward movement will permit them to engage and slit the tubing radially, it being understood that the cutters will be positively driven constantly.

Vertical movement of the rod 38 will be produced by a cam 46 which is engaged by a cam follower 47 on the lower end of the rod 38. This cam is on the outer end of a reciprocable rod 48 which is mounted for reciprocation in the guide sleeve 44. The opposite end of this rod 48 has a laterally extending rigid arm 49 which carries a cam follower 50 on its outer end that engages with the cam wheel 10. This wheel is provided with notches 51 in its periphery separated by wide lobes 52 and narrow lobes 53. A spring 54 cooperating with the rod 48 keeps the follower roller 50 in engagement with the cam wheel 10. Whenever the roller enters a notch 51, the cam 46 is moved to the right (FIG. 1) permitting the rod 38 and the rollers 35 carried thereby to drop and thereby permitting the plates 28 to be drawn together by the spring 36. This, in turn, will swing the cutters 25 radially inwardly to slit radially through the tubing. The shape of the lobes 52 and 53 of the cam wheel will determine the longitudinal spacing pattern of the slits and can be varied by substituting different wheels. The angular arrangement of the slits, as previously indicated, can be varied by adjusting the hinge supports of the arms 28 by the bolt and slots 31—32.

It will be apparent that with this apparatus the tubing T will emerge from the extruding machine and will be fed into association with the slitting apparatus which will produce slots at spaced intervals determined by the rotary cam 10 and the angular positions determined by the adjustment of the plates 28 through the medium of the hole and slot connections 30—31. The longitudinal pattern and angular disposition may be readily varied as previously indicated. The cutters will always be disposed radially relative to the tubing and will produce radially extending slots with the result that there will be less stress on the cutters and the wall of the tubing. The tubing will be adequately supported during the cutting operation by the support rollers 18 which will embrace it. The angular adjustment of the cutters will not disturb their radial relationship to the tubing and the variation in longitudinal spacing possible will not affect the radial positioning.

I claim:

1. Apparatus for forming slots in elongated, linearly moving, tubing comprising:

slot cutting means including at least two rotary cutters supported for independent reciprocable movement in respective planes alined with and passing radially through the longitudinal axis of the tubing, said planes of movement being angularly-spaced relative to each other about the longitudinal axis of the tubing;

a rotary cam with a specific cam surface drivingly coupled with the linearly moving conduit and revolved in timed relationship thereto; and motion transmitting means mechanically interconnecting said rotary cam and said slot cutting means for simultaneously reciprocating said rotary cutters in their respective radial planes, said motion transmitting means including a cam follower cooperating with said rotary cam surface to cause reciprocation of said rotary cutters in forming slots in the tubing in a predetermined longitudinal pattern.

2. Apparatus according to claim 1 in which said cutters are supported on arms mounted on a supporting structure through which said tubing is advanced, said arms being hinged to said supporting structure so that the cutters are supported in the radially disposed planes relative to the tubing, said arms being in converging planes directed toward the path of movement of the tubing, said motion-transmitting means controlling swinging of said arms toward and and away from each other to move said cutters radially toward and from said tubing.

3. Apparatus according to claim 2 including hinge means for supporting said arms, and means for adjusting said hinge means on said supporting structure concentrically about the axis of movement of said tubing.

4. Apparatus according to claim 3 including roller means for engaging and supporting the moving tubing during the slotting operation.

5. Apparatus according to claim 2 in which said motion-transmitting means includes a crosshead having rollers engaging said hinged plates, and means for reciprocating said crosshead between said converging plates, said means comprising cam means actuated by said rotary cam.